(12) United States Patent
Ginther

(10) Patent No.: US 8,246,520 B2
(45) Date of Patent: Aug. 21, 2012

(54) CONTROL METHOD TO DYNAMICALLY LIMIT ENGINE TORQUE TO PROVIDE CLUTCH OVERHEATING PROTECTION

(75) Inventor: Brian B. Ginther, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 772 days.

(21) Appl. No.: 12/225,610

(22) PCT Filed: May 3, 2007

(86) PCT No.: PCT/US2007/010618
§ 371 (c)(1),
(2), (4) Date: May 11, 2009

(87) PCT Pub. No.: WO2007/130446
PCT Pub. Date: Nov. 15, 2007

(65) Prior Publication Data
US 2009/0318265 A1 Dec. 24, 2009

Related U.S. Application Data

(60) Provisional application No. 60/797,159, filed on May 3, 2006.

(51) Int. Cl.
*B60W 10/02* (2006.01)
(52) U.S. Cl. ........................................................ 477/181
(58) Field of Classification Search .................. 477/176, 477/181
See application file for complete search history.

(56) References Cited

U.S. PATENT DOCUMENTS

| 5,667,283 | A | 9/1997 | Drennen et al. |
| 5,735,128 | A | 4/1998 | Zhang et al. |
| 6,422,099 | B1 | 7/2002 | Sun |
| 2005/0177294 | A1 | 8/2005 | Jiang et al. |
| 2007/0039770 | A1* | 2/2007 | Barrette et al. ............... 180/197 |

FOREIGN PATENT DOCUMENTS

| DE | 102 40 843 | 3/2003 |
| DE | 103 12 088 | 9/2004 |
| EP | 1 270 305 | 1/2003 |
| EP | 1 637 784 | 3/2006 |
| GB | 854136 | 11/1960 |
| GB | 2 234 033 | 1/1991 |
| GB | 2 336 420 | 10/1999 |
| WO | WO 97/30616 | 8/1997 |
| WO | WO 2005/009774 | 2/2005 |
| WO | WO 2005/021954 | 3/2005 |

* cited by examiner

*Primary Examiner* — Edwin A Young
(74) *Attorney, Agent, or Firm* — Warn Partners, P.C.

(57) ABSTRACT

A method for controlling the axle coupling clutch of an all wheel drive vehicle is provided. A determination is made to confirm that a coupling clutch operating property is at a predetermined entrance value. If the determination concludes that the coupling clutch operational property is at a predetermined entrance value, a signal is sent to an engine controller to modify engine torque output.

17 Claims, 1 Drawing Sheet

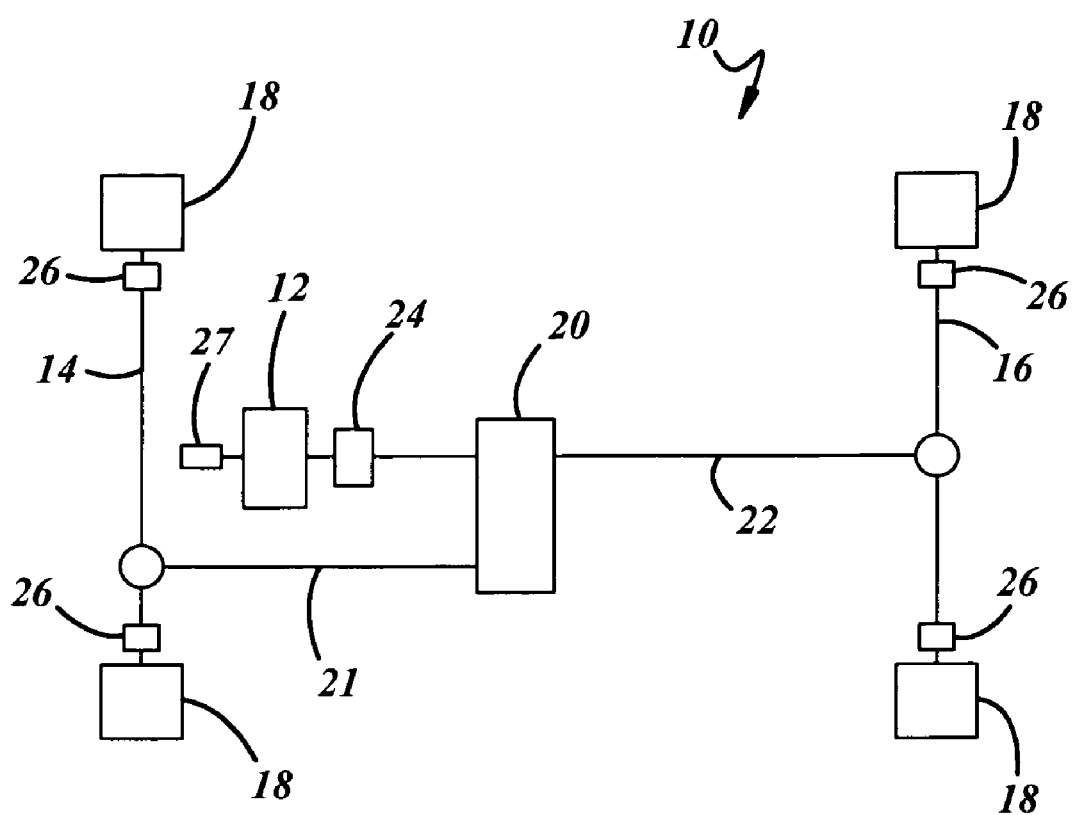

CONTROL METHOD TO DYNAMICALLY LIMIT ENGINE TORQUE TO PROVIDE CLUTCH OVERHEATING PROTECTION

CROSS REFERENCE TO RELATED APPLICATIONS

This application is a National Stage of International Application No. PCT/US2007/010618, filed May 3, 2007. This application claims the benefit of U.S. Provisional Application No. 60/797,159, filed May 3, 2006. The disclosures of the above applications are incorporated herein by reference.

FIELD OF THE INVENTION

The present invention relates to a method of controlling the amount of engine torque transferred to a coupling clutch of an all wheel drive vehicle and a vehicle provided with such a controlled coupling clutch. All wheel drive vehicles have an engine which is torsionally connected to a primary axle and a secondary axle. The primary axle can be the front axle or the rear axle. In many performance vehicles, the primary axle is typically the rear axle. Typically a coupling clutch is placed on a main drive shaft between the engine and the primary or rear axle. A secondary drive shaft delivers torque from the coupling clutch to the front axle. A controller is used to control the amount of torque applied to the front axle from the coupling clutch. Sensors on wheels on the front and rear axles send data to the controller to define various vehicle operating conditions. The controller then determines the amount of engine torque applied to the rear and front axles. In normal operation, torque to the secondary axle is minimized to enhance fuel economy. In bad weather conditions, torque to the secondary axle is greatly increased to enhance traction. The total amount of torques delivered from the engine to the axles is controlled by a throttle which is operated by a driver of the vehicle. The coupling clutch changes the amount of torque delivered from the engine to the rear wheels by modifying the pressure between the clutch plates of the coupling clutch. A small amount of slippage always exists within the coupling clutch therefore; the wheels on the primary axle typically rotate between 1% and 5% faster than the wheels on the secondary axle. As mentioned previously, there is always a small of slippage in the coupling clutch regardless of the vehicle operating conditions. This slippage in the coupling clutch causes a build up of heat which is removed from the plates of the coupling clutch primarily by the lubricating fluid used in the coupling clutch. In certain operating conditions, excessive clutch slippage or excessive heat build up can cause excessive wear or permanent damage to the coupling clutch. Therefore, it is desirable to protect the coupling clutch from certain unfavorable operating conditions.

It is desirable to lower the torque delivered through the coupling clutch to protect the clutch from an over slippage or over heating condition. Modifying the pressure of driving and driven plates of the coupling clutch is not a satisfactory solution since if engine torque is constant, a reduction in the pressure between the clutch plates typically causes an increase in clutch slippage and a resultant increase in undesired heat generation. In certain situations, as when the vehicle is in a turn, it is undesirable to reduce the proportion or the total amount of torque going to the secondary axle to prevent an understeer or oversteer condition as best explained in co-pending U.S. Patent Application PCT/US 07/0763 Mar. 28, 2007 commonly assigned. It is desirable to provide a method of operating a coupling clutch that can prevent the coupling clutch from being operated under stressful conditions without modifying the percentage of torque delivered to the secondary axle or keeping the amount of torque delivered to the secondary axle as a constant.

SUMMARY OF THE INVENTION

To meet the above noted desire, the present invention is brought forth. The present invention in one embodiment relates to a method for controlling the axle coupling clutch of an all wheel drive vehicle. A determination is made to confirm that a coupling clutch operating property is at a predetermined entrance value. If the determination concludes that the coupling clutch operational property is at a predetermined entrance value, a signal is sent to an engine controller to modify engine torque output. The engine torque output is modified continuously until the coupling clutch operational property is brought to a predetermined exit value. When the predetermined exit value of the clutch operational property is reached, engine torque modification is subsequently ended. A time limit can also end engine torque modification. The method of the present invention controls the coupling clutch to keep it away from operation in unfavorable conditions while at the same time modifying engine torque output for short durations wherein the modification of engine torque output is unrecognized by the vehicle operator.

BRIEF DESCRIPTION OF THE DRAWINGS

FIG. 1 is a schematic view of an all wheel drive vehicle utilizing the apparatus and method of the present invention.

DETAILED DESCRIPTION OF THE INVENTION

The following description of the preferred embodiments is merely exemplary in nature and is in no way intended to limit the invention, its application, or uses.

Referring to FIG. 1, an all wheel drive (AWD) vehicle 10 having coupling clutch overheating protection is provided. The vehicle 10 has an computer-controlled engine 12 which is torsionally connected to a primary rear axle 16 and a steered secondary front axle 14. However, it should be appreciated that the primary axle can be the front axle 14 and the secondary axle can be the rear axle 16. For purposes of the explanation below, the rear axle 16 is the primary axle and the front axle 14 is the secondary axle.

Wheels 18 are connected with both ends of the front axle 14 and rear axle 16. Typically, a coupling clutch 20 is placed on a drive shaft 22 between the engine 12 and the rear axle 16. A shaft 21 delivers torque from a driven clutch plate of the coupling clutch 20 to the front axle 14. A controller 24 is then used to control the amount of torque applied to the front axle 14 through the coupling clutch 20. Furthermore, sensors 26 are placed on the vehicle 10 in order to determine vehicle operating conditions. Data from the sensors 26 is transmitted to the controller 24. The controller 24 determines the amount of engine torque to apply to the front axle 14 and rear axle 16. Normally, the total amount of torque transferred from the engine 12 to the axles 14, 16 is controlled by a throttle 27 which is operated by a driver of the vehicle 10 Thus, depending on the position of the throttle 27 and the rate of change of the position of the throttle 27, otherwise known as the throttle 27 rack, the amount of torque transferred from the engine 12 to the axles 14, 16 is changed.

Various road and driving conditions can generate a coupling clutch overheating condition. In one example, the vehicle 10 is stopped at a stop sign. The pavement underneath the rear axle 16 has a low coefficient of friction surface provided by a patch of ice or snow. The front axle 14 rests under a dry patch of pavement having a much higher coefficient of friction. The driver now commands a hard acceleration of the vehicle 10. The driven and driving plates of the coupling clutch during normal vehicle operation can rotate at about 0-9,000 RPMs. Due to the slippage of the rear wheels on the ice, the drive shaft will tend to rotate under a low resistance causing in a normally high RPM rate on the driving plate of the coupling clutch 20 causing it to accelerate beyond a normal RPM rate when considered for a rate of speed of the vehicle. A determination is made by the controller 24 of the clutch rotational speed of the driving plate verses the clutch rotational speed of the driven plate. The differential in the rotational speeds of the two plates of the coupling clutch 20 is commonly referred to as the clutch slippage. A calculation is made to determine if the actual clutch slippage is beyond acceptable operational limits. To determine what would be an acceptable or allowable clutch slippage, the controller 24 can refer to a lookup table that determines clutch slippage by functions dependent upon vehicle speed and vehicle lateral acceleration. Alternatively, the controller 24 can calculate allowed clutch slippage based upon a function dependent upon the above-noted two variables. The allowed clutch slippage is then compared with the actual clutch slippage to determine slippage error. If clutch slippage error is more than a 1000 RPMs (an entrance value), then the entrance criteria for clutch slippage have been reached. Upon a determination that clutch slippage error is over a 1000 RPMs, a signal is given to the engine controller to modify the engine torque output by reducing the engine torque typically in the range of 5%. For very short time durations, torque reduction may approach 20%. To determine the exact amount needed, typically, a PID controller is used which multiplies clutch error slippage by a first gain factor and then multiples the integral of clutch slippage error by a second gain factor, and then further multiplies the derivative of clutch slippage error by a third gain factor to determine the desired modification in the engine torque. The actual method of reducing engine torque is accomplished by the aforementioned engine controller. The engine controller may modify engine torque output by spark timing or throttle control or other suitable methods. The duration of engine torque modification is typically less than 5 seconds and is unnoticed by the vehicle operator. Continually, the controller 24, at approximately 5 millisecond intervals, determines clutch slippage error. When clutch slippage error typically goes under 50 RPMs (clutch slippage error exit value), a signal will be delivered from the controller 24 to the engine controller to terminate engine torque modification. It is not uncommon for the entrance and exit values to differ with the exit value commonly being lower.

Clutch slippage error is just one of a group of coupling clutch operating properties that can be utilized in protecting the coupling clutch. Another property which can be utilized to protect the clutch is that of the coupling clutch temperature. For coupling clutch temperature, an entrance value can be determined from the temperature of the driving or driven clutch plates themselves or a proxy for their temperature which is typically the temperature of the lubricating fluid utilized to cool the clutch. When utilizing the temperature property, a typical entrance temperature is 130° C. A typical exit temperature is 110° C.

Another clutch operational property is that of mechanical power produced or heat energy generated by the clutch plates caused by the slippage. Mechanical power produced is essentially equal to the actual slippage times the normal force that the coupling clutch plates engage one another times the coefficient of friction times the radius of the clutch. A power rate of 10 kilowatts is often an appropriate entrance value and a power rate of 5 kilowatts is often utilized as an exit value. Typically, when the engine torque is reduced due to mechanical power produced or the temperature, the period of engine modification will be timed out, typically lasting less than 5 seconds, however, even in these occasions the modification is made in such a way to attempt to be unnoticed by a vehicle operator. Additionally, the current invention can be utilized wherein the controller 24 utilizes all three methods mentioned, that being a determination for excess clutch slippage, excess mechanical energy by the coupling clutch or excess temperature. Whichever property reaches the entrance value, that property condition will cause a modification in engine torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

What is claimed is:

1. A method of controlling an axle coupling clutch on an all wheel drive vehicle comprising:
    determining if a coupling clutch operational property is at a pre-determined entrance value, said entrance value being a variable dependent upon lateral acceleration of said vehicle; and
    modifying engine torque output until said clutch operational property is at a pre-determined exit value wherein said engine torque is no longer modified.

2. A method as described in claim 1, wherein said coupling clutch operational value is taken from at least one of a group of clutch slippage, clutch temperature, and clutch mechanical power produced.

3. A method as described in claim 2, wherein said coupling clutch operational value is clutch temperature and said clutch temperature is determined by clutch lubricant temperature.

4. A method as described in claim 2, wherein said coupling clutch operational value includes clutch slippage, clutch temperature and clutch mechanical power produced and a determination is made if any coupling clutch operational value is of a pre-determined entrance value to modify engine torque output until said coupling clutch operational value is at a pre-determined exit value or wherein said engine torque modification is timed out wherein said engine torque is no longer modified.

5. A method as described in claim 1, wherein said engine torque modification can be timed out.

6. A method as described in claim 1, wherein said modification of engine torque is of a short duration less than five seconds.

7. A method as described in claim 1, wherein said coupling clutch operational property entrance value differs from said exit value.

8. A method for controlling an axle coupling clutch of an all wheel drive vehicle comprising:
    determining clutch slippage of said clutch;
    determining if clutch slippage is at a pre-determined entrance condition value, said entrance condition value of clutch slippage being a variable dependent upon lateral acceleration of said vehicle; and
    modifying engine torque output until said clutch slippage is at a pre-determined exit value wherein engine output is no longer modified.

9. A method as described in claim 8, wherein said modification of engine torque is of a short duration less than five seconds.

10. A method as described in claim 8, wherein said entrance condition value of clutch slippage differs from said exit condition value of clutch slippage.

11. A method as described in claim 10, wherein said entrance condition value of clutch slippage is greater than said exit condition value of clutch slippage.

12. A method as described in claim 8, wherein said engine torque modification can be timed out.

13. An all-wheel drive vehicle comprising:
an engine controlled by an engine controller;
a primary axle powered by said engine;
a secondary axle powered by said engine;
a coupling clutch for selectively delivering power from said engine to said secondary axle;
a controller for said coupling clutch and wherein said controller determines if a coupling clutch operational property is at a predetermined entrance value; and
wherein said coupling clutch controller delivers a signal to said engine controller to modify engine torque output when said coupling clutch controller determining said clutch operational property is at an entrance value, said entrance value being a variable dependent upon lateral acceleration of said vehicle, and said coupling clutch controller delivers a signal to said engine controller to terminate engine torque output modification when said clutch operational property is at a predetermined exit value or when said engine torque modification is timed out.

14. An all-wheel drive vehicle as described in claim 13, wherein said coupling clutch operational property is clutch slippage.

15. A vehicle as described in claim 13, wherein said coupling clutch operational value is clutch temperature.

16. A vehicle as described in claim 13, wherein said coupling clutch operational value is mechanical power produced.

17. A vehicle as described in claim 13, wherein said coupling clutch controller is cogniscent of clutch slippage, clutch temperature and clutch mechanical power produced and wherein said coupling clutch controller will signal said engine controller to modify engine torque based upon any one of said clutch coupling property at a predetermined entrance value for said clutch coupling property.

* * * * *